Aug. 23, 1960    J. A. DE TORE ET AL    2,949,965
ROTOR HUB
Filed Oct. 15, 1957    3 Sheets-Sheet 1

INVENTORS
JOHN A. DE TORE
ROBERT L. LICHTEN
BY ARTHUR C. ROBERTSON

Beau, Brooks, Buckley & Beau,
ATTORNEYS

INVENTORS
JOHN A. DETORE
ROBERT L. LICHTEN
BY ARTHUR C. ROBERTSON

*Beau, Brooks, Buckley + Beau*
ATTORNEYS

United States Patent Office 2,949,965
Patented Aug. 23, 1960

2,949,965
ROTOR HUB

John A. De Tore, Arlington, and Robert L. Lichten, Dallas, Tex., and Arthur C. Robertson, Encino, Calif., assignors to Bell Helicopter Corporation, Fort Worth, Tex.

Filed Oct. 15, 1957, Ser. No. 690,245

7 Claims. (Cl. 170—160.25)

This invention relates to rotary wing aircraft, and more particularly to multi-bladed semi-rigid rotor constructions in helicopter aircraft or the like. The present invention, furthermore, relates to specific improvements in rotor constructions of the type disclosed in U.S. patent application Serial No. 594,914 filed June 29, 1956, now abandoned.

A primary object of the present invention is to provide an improved rotor as aforesaid capable of giving increased longitudinal and lateral control through the medium of cyclic feathering.

Another object is to provide an improved semi-rigid type rotor having three or more blades, providing adequate flight control while tolerating a greater range of longitudinal and lateral aircraft center of gravity locations.

Other objects and advantages of the invention will appear from the specification hereinafter.

Whereas, semi-rigid or "see-saw" type rotors are freely hinged to the drive shaft (or rotor mast), and therefore aircraft control effects are obtained solely by inclination of the rotor thrust vector; with the present invention, additional control moments can be produced at the rotor hub by using cyclic feathering to incline the rotor disc. However, to successfully employ the latter system an isotropic spring restraint must be imposed between the mast and the universally-mounted rotor hub. For example, by use of a suitable spring in such an arrangement, control moments about the aircraft C.G. may be multiplied two or three fold; whereas in a two-bladed rotor such an arrangement would result in a twice-pre-revolution vibratory moment which would produce undesirable vibrations in the system.

With the advent of high powered helicopters having considerably increased disc loadings and forward speeds, the possible advantages of using rotors having more than two blades include: (a) Reduction of rotor induced vibration amplitudes due to second and third harmonic excitation. (b) Reduction of rotor-induced noise due to reduction of blade vortex strength. (c) Reduction of vibratory control loads due to decrease in individual blade chord, (d) slight reduction of power consumed due to induced airflow, (e) Renders practicable incorporation of simple means for developing steady rotor hub moments, for improved control with semi-rigid rotor designs.

Structural simplicity is attainable in a multi-bladed rotor by utilizing the basic semi-rigid rotor system. Thus, the needs for individual blade flapping hinges, drag hinges, and drag dampers are eliminated. Then if the design is given sufficient chordwise rigidity, problems of ground resonance are removed altogether, since blade in-plane motion is not appreciable at any rotor speed.

The most practical arrangement for a multi-bladed rotor of the semi-rigid type is with a universally-mounted hub yoke supporting blades which are individually mounted on the yoke spindles for cyclic and collective feathering. The feathering bearings in the new hub may be relieved from carrying a centrifugal load, since they may be unloaded by means of blade retention straps. This blade retention and feathering features of the new hub are readily adaptable to a multi-bladed, semi-rigid rotor hub and can greatly reduce the complexity of such a rotor over present multi-bladed rotor configurations.

Figure 1:
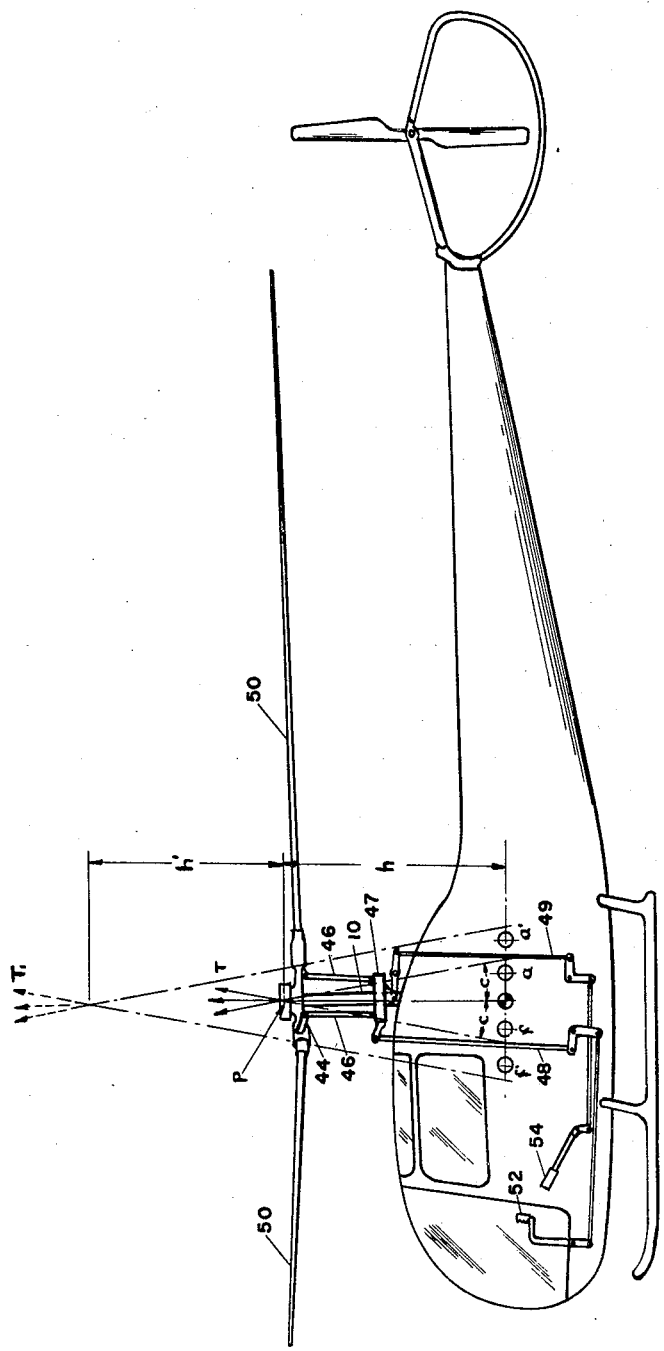
Fig. 1 is a general side elevational view of a helicopter embodying the invention and showing the pilot rotor control mechanism thereof somewhat schematically.
Figure 2:
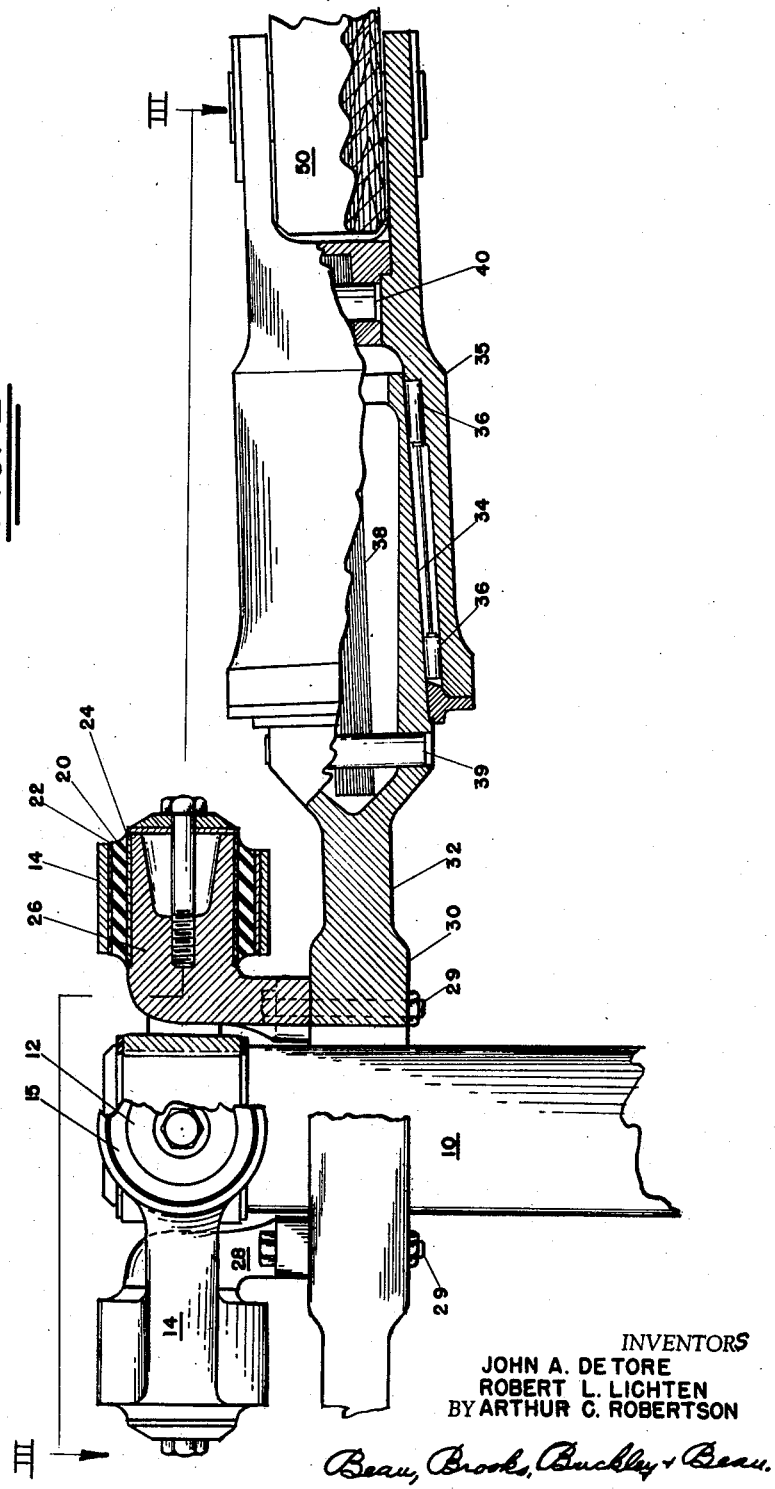
Fig. 2 is a fragmentary side elevational view on an enlarged scale, with portions broken away and showing insection the rotor construction thereof.
Figure 3:
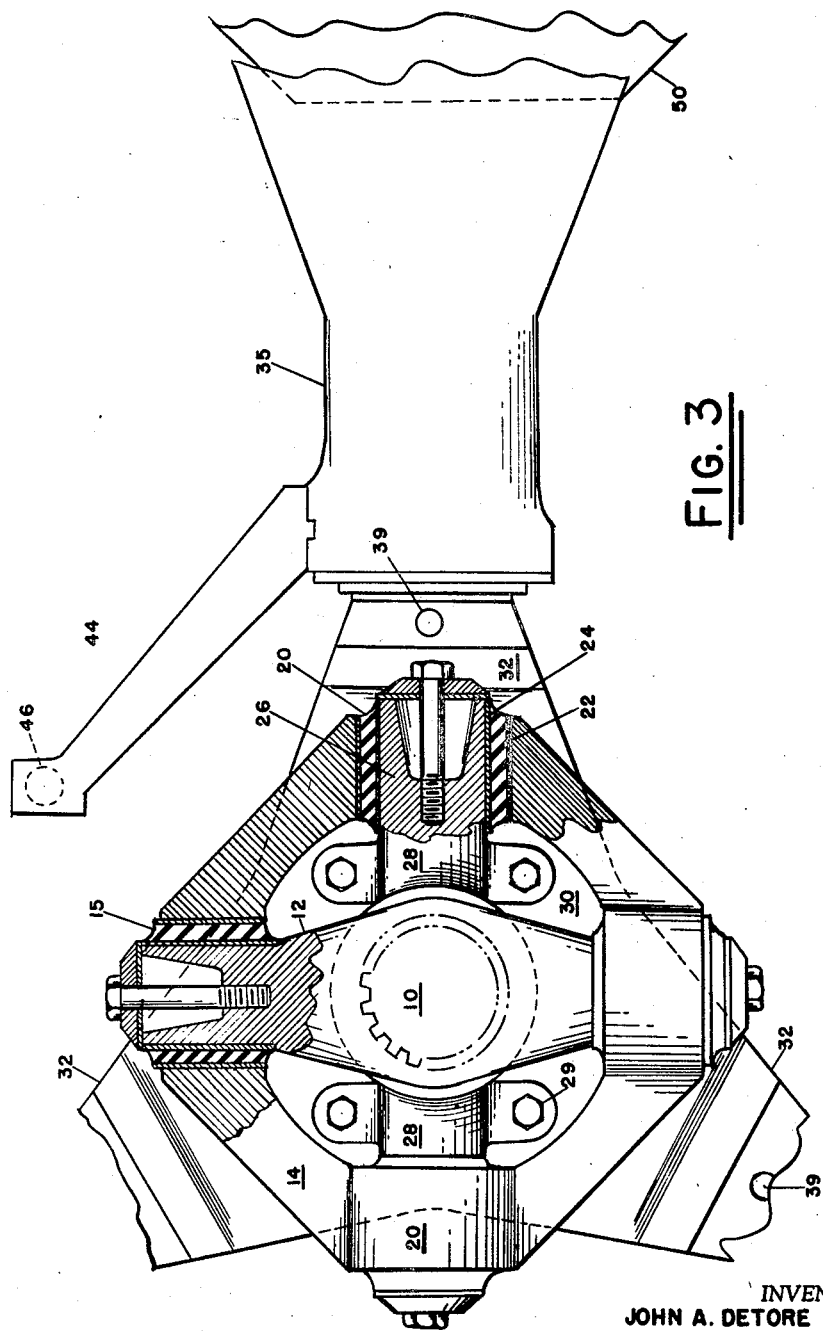
Fig. 3 is a fragmentary section taken along the line III—III of Fig. 2.

Thus, as illustrated by way of example herein, the rotor may be mounted for universal motions on a helicopter rotor drive shaft (or mast) as indicated at 10, by means of a core or cross-head 12 which is slip-fitted in driving keyed relation on the mast 10. A hub ring 14 is mounted for limited universal pivoting movements upon the opposite ends of the core 12 and is resiliently restrained by means of rubber bushings or the like as indicated at 15—15. The inner sleeves of the bushings 15—15 are keyed to the core 12 and the outer sleeves are keyed to the hub ring 14. The hub ring 14 also mounts a pair of transverse radially extending rubber bushings 20—20; the outer sleeves 22 of which are keyed to the hub ring 14, and the inner sleeves 24 of which are keyed to stub shafts 26 extending radially from upstanding blocks 28 bolted as indicated at 29 to the hub portion 30 of the rotor blade mounting yoke.

The yoke 30 includes integrally therewith radially extending arms 32 equal in number to the number of rotor blades of the system, and each arm 32 terminates in a spindle 34 upon which are rotatably mounted the blade grip or clevis components 35, as by means of bearings 36—36. As explained in our prior application Serial No. 594,914, tension straps 38 comprising laminations of spring steel or the like may be connected at their opposite ends as indicated at 39—40 to the yoke spindles 34 and to the blade grips 35, respectively. These straps restrain the blades against longitudinal displacements under centrifugal loads while the blades are still free to rotate for blade pitch change purposes within the limits of elasticity of the devices 38. The blade pitch control horns are indicated at 44 and the horn actuating push-pull rod and swash plate control systems are indicated at 46, 47, 48, 49 (Fig. 1). The rotor blades are indicated at 50. The pilot cyclic pitch control lever is illustrated at 52, and the collective pitch control lever is shown at 54.

As shown schematically in Fig. 1, the present invention provides an increased control function for the following reasons. The axis of the rotor pivoting is indicated at $p$ and the rotor thrust vector is indicated at T.

The maximum fore and aft flapping angle of the rotor as produced by cyclic control thereof and as limited by the hub and control system mechanical clearances, is indicated at $c$—$c$. The vertical distance from the center of gravity to the elevation of the rotor pivot axis is indicated at $h$. For a conventionally mounted rotor without the use of centering springs or the like as referred to hereinabove, the allowable center of gravity range of positions will lie between points such as indicated at $f$ and $a$ (Fig. 1) and these points must lie somewhat inside the area determined by projection of the rotor thrust vector line T in the maximum tilt angles $c$—$c$. Some control margin must be preserved for maneuvering purposes and to permit for correction of aerodynamic disturbances.

Use of a hub centering resiliency of a stiffness $k$ (ft.-lbs./radian) in terms of the moment generated at point $p$ due to the inclination of the rotor disc, provides the requisite additional control moment. The maximum value of this moment equals $c \times k$. The effect is equivalent to raising point $p$ through a height $h'$ where $$h' = \frac{k}{W}$$

when $W$ represents the gross weight of the helicopter. This in turn effectively increases the allowable center of gravity travel by an amount approximately equal to $c \times h'$, or $$c \times \frac{k}{W}$$

at each end of the range. Thus the forward and aft limits of travel may be extended as to positions $f'$ and $a'$ on the diagram of Fig. 1.

Thus it will be appreciated that by virtue of the present invention a multi-bladed rotor construction is provided which embodies in combination with the advantages of the semi-rigid rotor system structural simplicity, the further advantages heretofore obtained only in connection with multi-blade rotor systems.

What is claimed is:

1. An aircraft lift rotor mechanism comprising a drive shaft, a core carried by said shaft and extending transversely therefrom in end view, a hub ring pivotally mounted upon the opposite ends of said core and encircling said shaft and pivotable upon said core about an axis extending transversely of said shaft, a pair of pillow blocks pivotally carried by said hub ring at diametrically opposed positions thereon in alignment transverse to the alignment of mounting of said hub ring upon said core, resilient connection means interconnecting said pillow blocks and said hub ring and resiliently restraining pivotal movements of said pillow blocks relative to said hub ring, a yoke freely encircling said shaft and carried by depending portions of said pillow blocks at an elevation below the level of said hub ring, a plurality of yoke arms extending radially from said yoke, a rotor blade mounted upon each of said yoke arm portions so as to be freely rotatable thereon about its longitudinal pitch change axis, tension strap means extending generally longitudinally of each of said blades and interconnecting it to its supporting yoke arm, said strap means being resilient in torsion, a swash plate mounted upon said drive shaft and pilot-controllable to tilt relative thereto, and push-pull linkage interconnecting said swash plate and said rotor blades so as to control the pitch adjustments thereof about their longitudinal pitch change axes.

2. In an aircraft, a semi-rigid type lift, propulsion or control rotor including a drive shaft, a core carried by said shaft to rotate therewith and thereon, a hub ring carried by said core to be pivotable thereon about an axis transverse to the long axis of said shaft, a yoke freely encircling said shaft below the level of said hub ring and pivotally mounted thereon to swing about an axis transverse to said first mentioned axis, resilient connection means coupling said yoke and said hub ring and operable to damp pivotal movements of said yoke relative to said hub ring, a plurality of yoke arms extending in radial directions from said yoke, a rotor blade mounted upon each of said yoke arm portions so as to be freely rotatable about the longitudinal pitch change axis of said blade, tension strap means extending generally longitudinally of each of said blades and interconnecting it to the corresponding of said yoke arms, said strap means being resilient in torsion, a swash plate mounted upon said drive shaft and pilot controllable to tilt relative thereto, and push-pull linkage means interconnecting said swash plate and said rotor blades so as to control the pitch adjustments thereof about their longitudinal pitch change axes.

3. An aircraft lift rotor mechanism comprising a drive shaft, a core carried by said shaft and extending transversely therefrom in end view, a hub ring pivotally mounted upon the opposite ends of said core and encircling said shaft and pivotable upon said core about an axis extending transversely of said shaft, a pair of pillow blocks pivotally carried by said hub ring at diametrically opposed positions thereon in alignment transverse to the alignment of mounting of said hub ring upon said core, resilient connection means interconnecting said pillow blocks and said hub ring and resiliently restraining pivotal movements of said pillow blocks relative to said hub ring, a yoke freely encircling said shaft and carried by said pillow blocks, a plurality of yoke arms extending radially from said yoke, a rotor blade mounted upon each of said yoke arm portions so as to be freely rotatable thereon about its longitudinal pitch change axis, means interconnecting each of said blades to its supporting yoke arm, a swash plate mounted upon said drive shaft and pilot-controllable to tilt relative thereto, and push-pull linkage interconnecting said swash plate and said rotor blades so as to control the pitch adjustments thereof about their longitudinal pitch change axes.

4. An aircraft lift rotor mechanism comprising a drive shaft, a core carried by said shaft and extending transversely therefrom in end view, a hub ring pivotally mounted upon the opposite ends of said core and encircling said shaft and pivotable upon said core about an axis extending transversely of said shaft, resilient connection means coupling said hub ring and said core and resiliently damping motion of said hub ring relative to said core, a pair of pillow blocks pivotally carried by said hub ring at diametrically opposed positions thereon in alignment transverse to the alignment of mounting of said hub ring upon said core, resilient connection means coupling said pillow blocks and said hub ring and resiliently damping pivotal movements of said pillow blocks relative to said hub ring, a yoke freely encircling said shaft and carried by depending portions of said pillow blocks at an elevation below the level of said hub ring, a plurality of yoke arms extending radially from said yoke, a rotor blade mounted upon each of said yoke arm portions so as to be freely rotatable thereon about its longitudinal pitch change axis, a swash plate mounted upon said drive shaft and pilot-controllable to tilt relative thereto, and push-pull linkage interconnecting said swash plate and said rotor blades so as to control the pitch adjustments thereof about their longitudinal pitch change axes.

5. In an aircraft, a semi-rigid type lift, propulsion or control rotor including a drive shaft, a core carried by said shaft to rotate therewith and thereon, a hub ring carried by said core to be pivotable thereon about an axis transverse to the long axis of said shaft, resilient connection means coupling said hub ring and said core and resiliently damping motions of said hub ring relative to said core, a yoke freely encircling said shaft below the level of said hub ring and pivotally mounted thereon to swing about an axis transverse to said first mentioned axis, resilient connection means coupling said yoke and said hub ring and damping pivotal movements of said yoke relative to said hub ring, a plurality of yoke arms extending in radial directions from said yoke, a rotor blade mounted upon each of said yoke arm portions so as to be freely rotatable about the longitudinal pitch change axis of said blade, tension strap means extending generally longitudinally of each of said blades and interconnecting it to the corresponding of said yoke arms, said strap means being resilient in torsion, a swash plate mounted upon said drive shaft and pilot controllable to tilt relative thereto, and push-pull linkage means interconnecting said swash plate and said rotor blades so as to control the pitch adjustments thereof about their longitudinal pitch change axes.

6. In an aircraft, a rotor system including a drive shaft, a core carried by said shaft to rotate therewith and thereon, a hub ring carried by said core to be pivotable thereon about an axis transverse to the long axis of said shaft, resilient connection means coupling said hub ring and said core and resiliently damping motions of said hub ring relative to said core, a yoke freely encircling said shaft below the level of said hub ring and pivotally mounted thereon to swing about an axis transverse to said first mentioned axis, resilient connection means coupling said yoke and said hub ring and damping pivotal movements of said yoke relative to said hub ring, a plurality of yoke arms extending in radial directions from said yoke, a rotor blade mounted upon each of said yoke arm portions so as to be freely rotatable about the longitudinal pitch change axis of said blade, a swash plate mounted upon said drive shaft and pilot controllable to tilt relative thereto, and push-pull linkage means interconnecting said swash plate and said rotor blades so as to control the pitch adjustments thereof about their longitudinal pitch change axes.

7. In an aircraft, a rotor system including a drive shaft, a core carried by said shaft to rotate therewith and thereon, a hub ring carried by said core to be universally pivotable thereon about an axis transverse to the long axis of said shaft, resilient connection means coupling said hub ring and said core and a yoke freely encircling said shaft and pivotally mounted thereon to swing about any axis transverse to said first mentioned axis, resilient connection means coupling said yoke and said hub ring and damping pivotal movements of said yoke relative to said hub ring, a plurality of yoke arms extending in radial directions from said yoke, a rotor blade mounted upon each of said yoke arm portions so as to be freely rotatable about the longitudinal pitch change axis of said blade, a swash plate mounted upon said drive shaft and pilot controllable to tilt relative thereto, and push-pull linkage means interconnecting said swash plate and said rotor blades so as to control the pitch adjustments thereof about their longitudinal pitch change axes.

References Cited in the file of this patent
UNITED STATES PATENTS 2,633,924    Young  ---------------- Apr. 7, 1953

OTHER REFERENCES

American Helicopter, June, 1949, pages 11 and 12.